C. TRÜCK.
HORSESHOE.
APPLICATION FILED APR. 7, 1913.
1,193,948.
Patented Aug. 8, 1916.
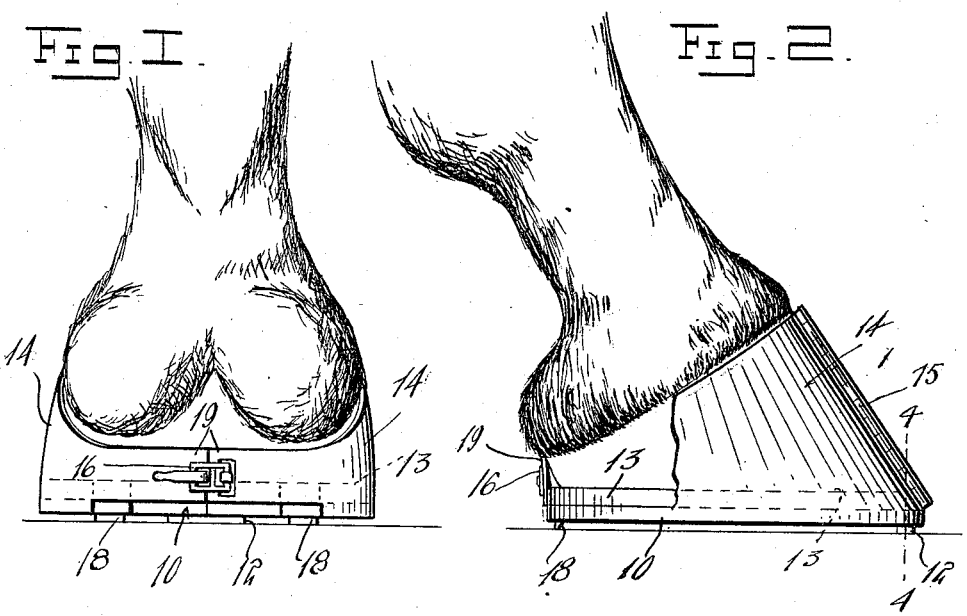
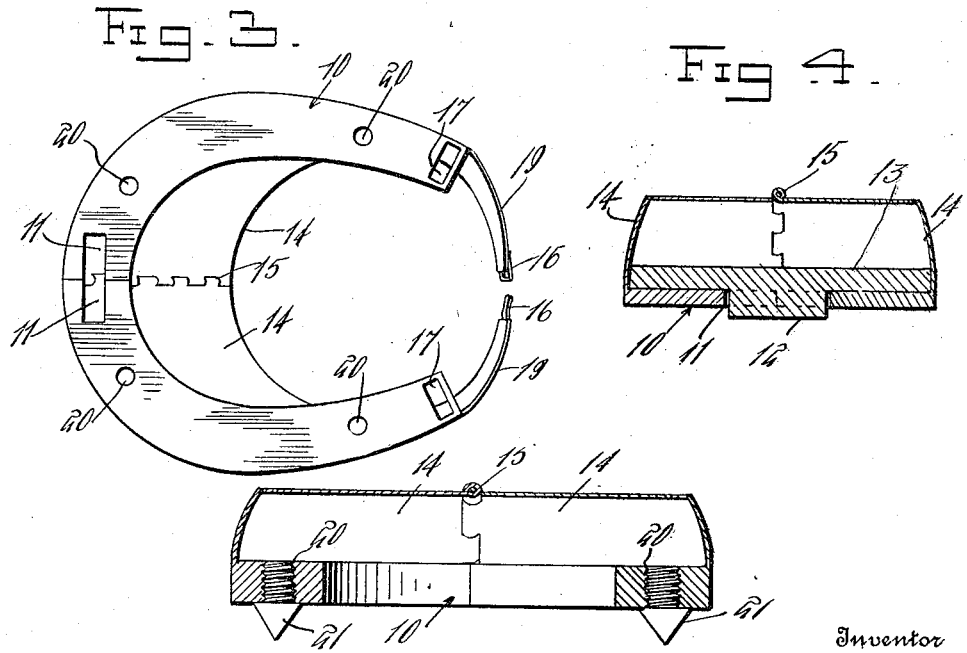

UNITED STATES PATENT OFFICE.

CRIS TRÜCK, OF GRAND RAPIDS, MICHIGAN.

HORSESHOE.

1,193,948. Specification of Letters Patent. Patented Aug. 8, 1916.

Application filed April 7, 1913. Serial No. 759,462.

*To all whom it may concern:*

Be it known that I, CRIS TRÜCK, a citizen of the United States, residing at Grand Rapids, in the county of Kent, State of Michigan, have invented certain new and useful Improvements in Horseshoes; and I do hereby declare the following to be a full, clear, and exact description of the invention, such as will enable others skilled in the art to which it appertains to make and use the same.

This invention relates to improvements in horse shoes, and particularly to shoes for attachment to the horse's hoofs without the use of nails.

One object of the invention is to provide a simple device of this character which can be quickly and easily attached to or detached from a horse's hoof without the use of nails or any special tools, and which can be attached to the horse's hoof, whether or not the hoof has the ordinary shoe attached thereto.

Other objects and advantages will be apparent from the following description when taken in connection with the accompanying drawings.

In the drawings: Figure 1 is a rear elevation of the shoe applied to the hoof. Fig. 2 is a side elevation of the same partly broken away. Fig. 3 is a bottom plan view of my shoe detached. Fig. 4 is a vertical section on the line 4—4 of Fig. 2. Fig. 5 is a fragmentary sectional detail showing the use of my shoe without the ordinary shoe being on the horse's hoof.

Referring particularly to the accompanying drawings, 10 represents two halves of an ordinary horse shoe which forms the base of my shoe, and on which the horse's hoof rests. In each of the sections 10 at the abutting ends is formed an opening 11, this opening extending through the end of the section and coöperating with the opening of the other section to form an elongated opening to receive therethrough the toe calk 12 of the shoe 13 which is attached to the horse's hoof. Attached to the outer edges of the sections 10, in any suitable manner are the shield sections 14, these sections being hinged together at their front ends as indicated at 15, the said shields being engaged around the horse's hoof, and secured at the rear by means of the clasp 16. In the heel portion of each of the sections 10 is formed a vertical opening 17 which is adapted to receive therethrough one of the heel calks 18 of the shoe 13.

From the foregoing, it will readily be seen that I have provided a simple device of this character and one which can be quickly and easily applied to or removed from the horse's hoof. In applying the device to the horse's hoof, which already has the ordinary shoe secured thereto, the sections 10 and 14 are swung open and placed about the horse's hoof. The sections are then drawn together so that the toe calk is clamped in the opening formed by the sections of openings 11, the rear portions of the sections 10 being pushed against the heel portion of the shoe 13 so that the heel calks 18 pass through the openings 17. The ends 19 are then brought together at the rear of the hoof and clamped together by the securing means 16.

Each of the sections 10 is provided with a plurality of threaded openings 20 into which the calks 21 are adapted to be screwed. The calks 21 may be used when the device is applied over the shoe 13, or when the device is applied directly to the hoof, but can be omitted from either case as desired. In this form the openings 11 and 17 are omitted.

What is claimed is:

A nailless horse shoe comprising a base portion in the form of the ordinary horse shoe divided at the forward part and having an elongated opening formed across the line of division for the clamping reception therethrough of the toe calk of an ordinary shoe which is attached to the horse's hoof, the rear ends of the base having openings for the passage therethrough of the heel calks, said base portion being provided with threaded openings for the reception of the stems of detachable calks, a sectional hinged shield carried by the base and completely inclosing the horse's hoof, and straps secured to the sections of the shield and detachably connected together at the rear of the hoof.

In testimony whereof, I affix my signature, in the presence of two witnesses.

CRIS TRÜCK.

Witnesses:
 HARRY E. RODGERS,
 JESSIE PURCELL.